Patented Jan. 1, 1929.

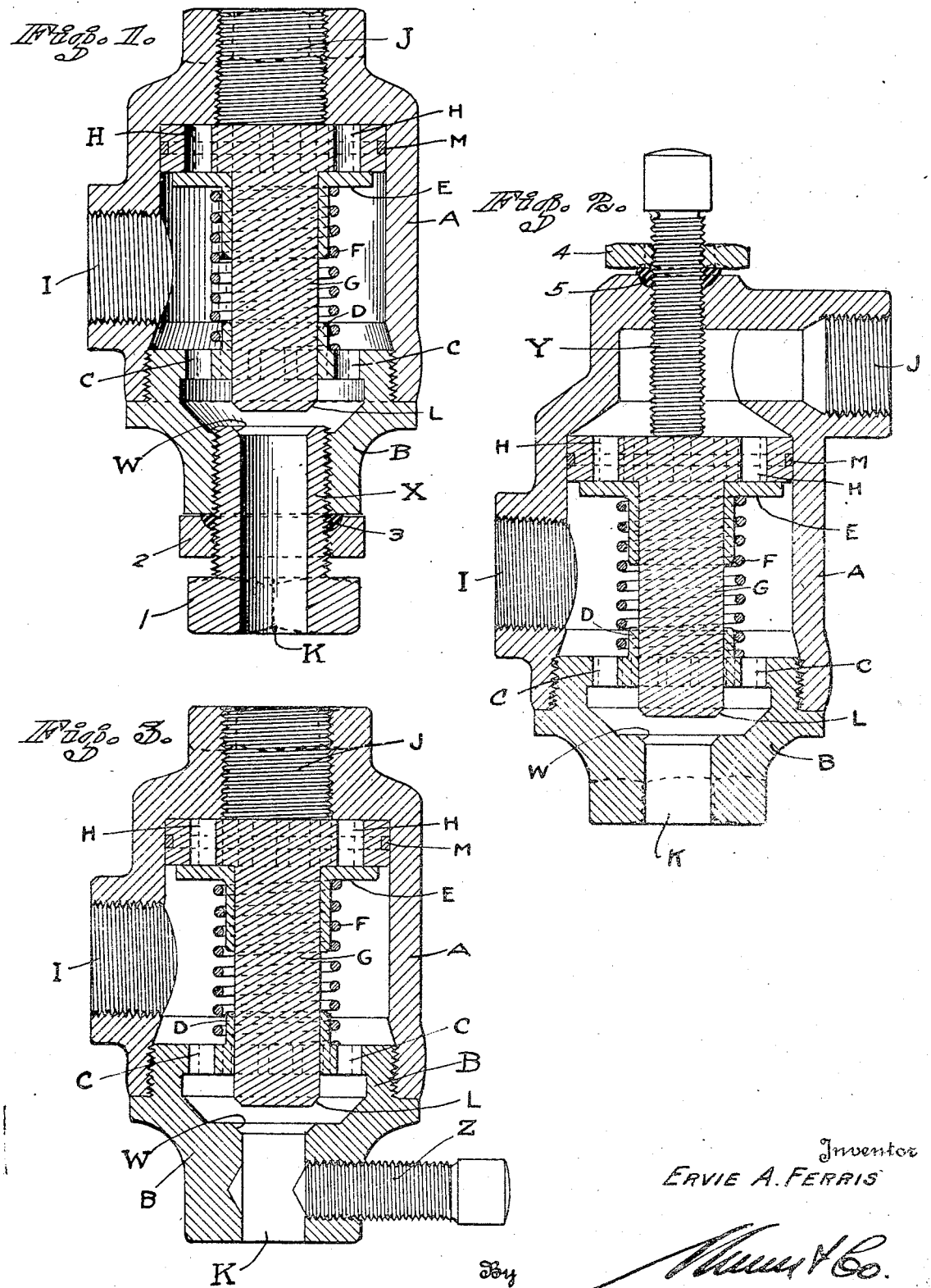

1,697,352

UNITED STATES PATENT OFFICE.

ERVIE A. FERRIS, OF WESTWOOD, CALIFORNIA.

AUTOMATIC EXHAUST VALVE.

Application filed August 14, 1924. Serial No. 732,066.

This invention relates to automatic exhaust valves of the type described in my copending application for United States patent filed April 14, 1924 Serial No. 706,435 and has to do with improvements thereon.

The valve in said application is adapted for a practically instantaneous exhaust of an air actuated machine operated through remote control and the present invention has for its object the provision of means on such a valve for controlling the rapidity of the automatic exhaust irrespective of the speed of operation of the remote control valve.

In the drawings hereto three different methods of accomplishing the objective are shown, the drawings all being substantially full size representations in longitudinal section through the valve.

In Figure 1 the exhaust control member is designated X in Figure 2 Y, and in Figure 3 Z.

In all figures the valve is the same as shown in my copending application referred to and comprises a cylindrical valve body A with an exhaust head B screwed thereon having exhaust ports C leading from the interior of the cylinder to a common exhaust K, D is a skirt on head B acting as guide for a slidable piston G and also a spacing collar for spring F to prevent it from binding against the piston. E is a check valve slidable on the piston G and covering the air holes H in the upper part of the piston, but being of lesser diameter than the piston.

F is a coil compression spring reacting against the body B and forcing both check valve E and piston G upwardly. G is a piston with a stem preferably formed integral therewith and with the large diameter of the piston being a sliding fit within the bore of the valve body, while the stem slides in the guiding skirt and has a tapered end L adapted to seat against a similar seat W on the common exhaust K to close off the same upon descent of the piston. H are port holes drilled through the head of piston.

M is a piston ring which insures a permanently tight seal to the piston but may be omitted in most installations. I is the outlet from the valve leading to the fluid operated apparatus or cylinder it is desired to operate. J is the fluid pressure inlet to the valve from the pipe or hose line having the remote control valve.

The operation of my valve is as follows: With the elements in the position shown and check valve E tightly seated over the holes in the piston G, air under pressure is admitted from remote control into the inlet port J and the piston is forced downward until its end L closes off the common exhaust port K and is held in this position as long as pressure is maintained in the line by reason of the superior area of the head of the piston upon which the incoming pressure acts.

As soon as the piston closes the port K the oncoming pressure from port J forces the check valve E downward on the stem of the piston by compressing the spring F and opens ports H thus allowing the pressure to pass through outlet port I directly to the apparatus or air cylinder to be operated.

The moment that the pressure in port J is reduced by exhausting the remote control valve, spring F together with the pressure confined to the apparatus or air cylinder through port I immediately forces the check valve E and piston G upward sealing off the slightly reduced pressure line and instantly exhausting the apparatus or pressure operated air cylinder through the common exhaust K.

In some cases however it is desired to control the exhaust and thereby the return stroke of one or several of a battery of machines—such for instance as air dogging machinery in a saw mill—and this is effected in the three designs shown respectively by the members X Y Z.

In Figure 1 the control member X takes the form of a threaded sleeve with a wrench head 1 at its outer end and the exhaust seat W formed on its inner end while the exhaust passage K passes through it. This arrangement provides for adjusting the seat toward or away from the end L of the piston and thus varying the exhaust clearance at this point and controlling the return operation of the exhausted machine.

A lock nut 2 secures the adjustable exhaust seat in place and if desired a packing ring at 3 prevents any leakage through the threads when the line pressure is on.

In Figure 2 a similar result is obtained by tapping the inlet J at right angles to the body as shown and running a set screw Y through the end of the body to limit the return movement of the piston G and thereby the exhaust clearance as described for Figure 1. This screw Y is locked by a nut 4 packed at 5 against leakage through the threads.

In Figure 3 the control takes the form of a set screw Z screwed through the side of the exhaust head to choke the port K to the required amount to make the machine function in the desired time interval.

The various devices accomplish the same purpose in much the same manner and as a person skilled in the art might evolve other modifications I feel entitled to cover in my appended claims any such modifications as may come within the spirit of this invention.

I claim:

1. A device of the type described, comprising a casing having inlet, outlet and exhaust ports, a piston mounted in said casing and having openings therein, said piston being adapted to close said exhaust port, a check valve for closing said openings in said piston, and a spring bearing against said check valve and against said casing, said spring aiding in the opening of the exhaust port.

2. A device of the type described, comprising a casing having inlet, outlet and exhaust ports, a piston mounted in said casing and having openings therein, said piston being adapted to close said exhaust port, a check valve for closing said openings in said piston and a spring bearing against said check valve and against said casing, said spring aiding in the opening of the exhaust port, and means for simultaneously adjusting the tension of said spring and also for varying the stroke of said piston.

ERVIE A. FERRIS.